(12) United States Patent
Rosenberg et al.

(10) Patent No.: US 10,330,872 B2
(45) Date of Patent: Jun. 25, 2019

(54) INTERFACING A FERRULE WITH A SOCKET

(71) Applicant: Hewlett Packard Enterprise Development LP, Houston, TX (US)

(72) Inventors: Paul Kessler Rosenberg, Sunnyvale, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/774,187

(22) PCT Filed: Nov. 24, 2015

(86) PCT No.: PCT/US2015/062334
§ 371 (c)(1),
(2) Date: May 7, 2018

(87) PCT Pub. No.: WO2017/091206
PCT Pub. Date: Jun. 1, 2017

(65) Prior Publication Data
US 2018/0321450 A1     Nov. 8, 2018

(51) Int. Cl.
*G02B 6/42*        (2006.01)
*G02B 6/36*        (2006.01)
(Continued)

(52) U.S. Cl.
CPC .......... *G02B 6/4214* (2013.01); *G02B 6/423* (2013.01); *G02B 6/4251* (2013.01); *G02B 6/36* (2013.01);
(Continued)

(58) Field of Classification Search
CPC ...... G02B 6/4201; G02B 6/4214; G02B 6/30; G02B 6/34; G02B 6/4228; G02B 6/423;
(Continued)

(56) References Cited

U.S. PATENT DOCUMENTS 5,671,311 A *   9/1997   Stillie .................. G02B 6/3817
                                                              385/60
5,732,175 A     3/1998   Fan
(Continued)

FOREIGN PATENT DOCUMENTS

CN       100472258 C     3/2009
EP        1182478        2/2002
(Continued)

OTHER PUBLICATIONS

Chuang, S. et al., "Development and Qualification of a Mechanical-optical Interface for Parallel Optics Links," (Research Paper). Feb. 11, 2015, 8 pages, available at http://www.usconec.com/LiteratureRetrieve.aspx?ID=222018.
(Continued)

*Primary Examiner* — Robert Tavlykaev
(74) *Attorney, Agent, or Firm* — Sheppard Mullin Richter & Hampton LLP

(57) ABSTRACT

A system for interfacing a ferrule with a socket includes a socket, a cover to optically couple a ferrule to the socket, and a gasket interposed between the cover and the ferrule. The gasket applies a compression force against the ferrule to secure the ferrule to the socket.

19 Claims, 9 Drawing Sheets

(51) Int. Cl.
 *G02B 6/38* (2006.01)
 *G02B 6/43* (2006.01)
(52) U.S. Cl.
 CPC .......... *G02B 6/3897* (2013.01); *G02B 6/4292* (2013.01); *G02B 6/43* (2013.01)
(58) Field of Classification Search
 CPC ...... G02B 6/4231; G02B 6/428; G02B 6/424; G02B 6/4251; G02B 6/4292
 USPC ...... 385/31, 36, 47, 88, 89, 92, 93; 398/135, 398/139, 200, 201, 212, 214
 See application file for complete search history.

(56) References Cited

U.S. PATENT DOCUMENTS

| | | | |
|---|---|---|---|
| 5,781,682 | A | 7/1998 | Cohen et al. |
| 6,019,519 | A | 2/2000 | Grinderslev et al. |
| 6,198,864 | B1 | 3/2001 | Lemoff et al. |
| 6,209,928 | B1 | 4/2001 | Benett |
| 6,250,818 | B1 | 6/2001 | Loughlin et al. |
| 6,682,230 | B1 | 1/2004 | Demangone |
| 6,815,729 | B1 | 11/2004 | Brophy et al. |
| 6,861,641 | B1 | 3/2005 | Adams |
| 6,890,107 | B1 | 5/2005 | Brophy et al. |
| 7,076,144 | B2 | 7/2006 | Loder et al. |
| 7,281,856 | B2 | 10/2007 | Grzegorzewska et al. |
| 7,281,862 | B2 | 10/2007 | Oen et al. |
| 7,329,054 | B1 | 2/2008 | Epitaux et al. |
| 8,277,128 | B2 | 10/2012 | Hackett |
| 8,398,421 | B2 | 3/2013 | Haberek et al. |
| 8,591,244 | B2 | 11/2013 | Thomas et al. |
| 8,932,084 | B2 | 1/2015 | Thackston et al. |
| 9,325,445 | B2 | 4/2016 | Khor et al. |
| 9,470,858 | B2 | 10/2016 | Houbertz-Krauss et al. |
| 9,651,745 | B2 | 5/2017 | Chou et al. |
| 2002/0172469 | A1 | 11/2002 | Benner |
| 2004/0109649 | A1* | 6/2004 | Mazotti ................ G02B 6/4249 385/94 |
| 2006/0088248 | A1 | 4/2006 | Tran |
| 2007/0297713 | A1 | 12/2007 | Lu et al. |
| 2009/0003826 | A1 | 1/2009 | Jeon et al. |
| 2010/0054671 | A1 | 3/2010 | Ban et al. |
| 2011/0108716 | A1 | 5/2011 | Shiraishi |
| 2011/0111624 | A1 | 5/2011 | Ball |
| 2011/0268397 | A1 | 11/2011 | Chan |
| 2011/0280523 | A1 | 11/2011 | Yeh et al. |
| 2012/0027345 | A1 | 2/2012 | Castagna et al. |
| 2013/0209040 | A1 | 8/2013 | Graham et al. |
| 2013/0216190 | A1* | 8/2013 | Haley ................ G02B 6/423 385/79 |
| 2013/0266255 | A1 | 10/2013 | Tan et al. |
| 2013/0272649 | A1 | 10/2013 | Braunisch et al. |
| 2014/0105549 | A1 | 4/2014 | Kohnishi |
| 2014/0154914 | A1 | 6/2014 | Schneider |
| 2014/0334778 | A1 | 11/2014 | Walker et al. |
| 2015/0063760 | A1* | 3/2015 | Pommer ............ G02B 6/4251 385/79 |
| 2015/0277067 | A1 | 10/2015 | Droesbeke |
| 2015/0301293 | A1* | 10/2015 | Seetharam ........... G02B 6/4277 385/60 |
| 2016/0116695 | A1* | 4/2016 | Nekado ................ G02B 6/421 385/14 |
| 2016/0195677 | A1 | 7/2016 | Panotopoulos et al. |
| 2016/0209610 | A1* | 7/2016 | Kurtz ................ G02B 6/4292 |
| 2017/0131492 | A1 | 5/2017 | Vallance et al. |

FOREIGN PATENT DOCUMENTS

| | | |
|---|---|---|
| EP | 1315991 | 6/2003 |
| WO | WO-9400785 | 1/1994 |
| WO | WO-20111008041 A2 | 1/2011 |
| WO | WO-2014021231 | 2/2014 |
| WO | WO-2014068357 | 5/2014 |

OTHER PUBLICATIONS

Delta Electronics, Inc., "Small Form Factor Bi-directional Transceiver Module for Gigabit Ethernet," SFBD-1250A4K1RS, Sep. 1, 2009, pp. 1-9, Revision: S3.
Neutrik, "opticalCON" (Web Page), Feb. 18, 2014, 40 pages, available at https://www.fclane.com/sites/default/files/Product%20Folder%20opticalCON.pdf.
PCT; "International Search Report" cited in Appl. No. PCT/US2016/019747; dated Oct. 27, 2016, 3 pages.
Rosenberg, P. K., et al.; "Non-Final Office Action cited in U.S. Appl. No. 15/650,197"; dated Aug. 9, 2018; 13 pages.
Rosenbeg, P. K., et al.; "U.S. Non-Final Office Action cited in U.S. Appl. No. 15/283,181" dated Dec. 21, 2018; 13 pages.

* cited by examiner

INTERFACING A FERRULE WITH A SOCKET

BACKGROUND

Optical interconnects may be used in connection with high-speed data transfer in computing networks. These optical interconnects couple optical fibers between computing devices within the networks to transfer data. Optical fibers are flexible, transparent fibers made by drawing, for example, glass (i.e., silica) or plastic to a diameter comparable to that of a human hair. The optical fibers transmit data signals in the form of light between the two ends of the fiber at the speed of light. This high-speed light transfer may be used to transfer data signals using a number of light sources (e.g., lasers) and a number of detectors (e.g., photodiodes) to send and receive the data signals. Optical fibers may be used instead of metal wires because signals travel along them with lesser amounts of loss, are also immune to electromagnetic interference, and transfer data with a greater combination of speed and distance.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
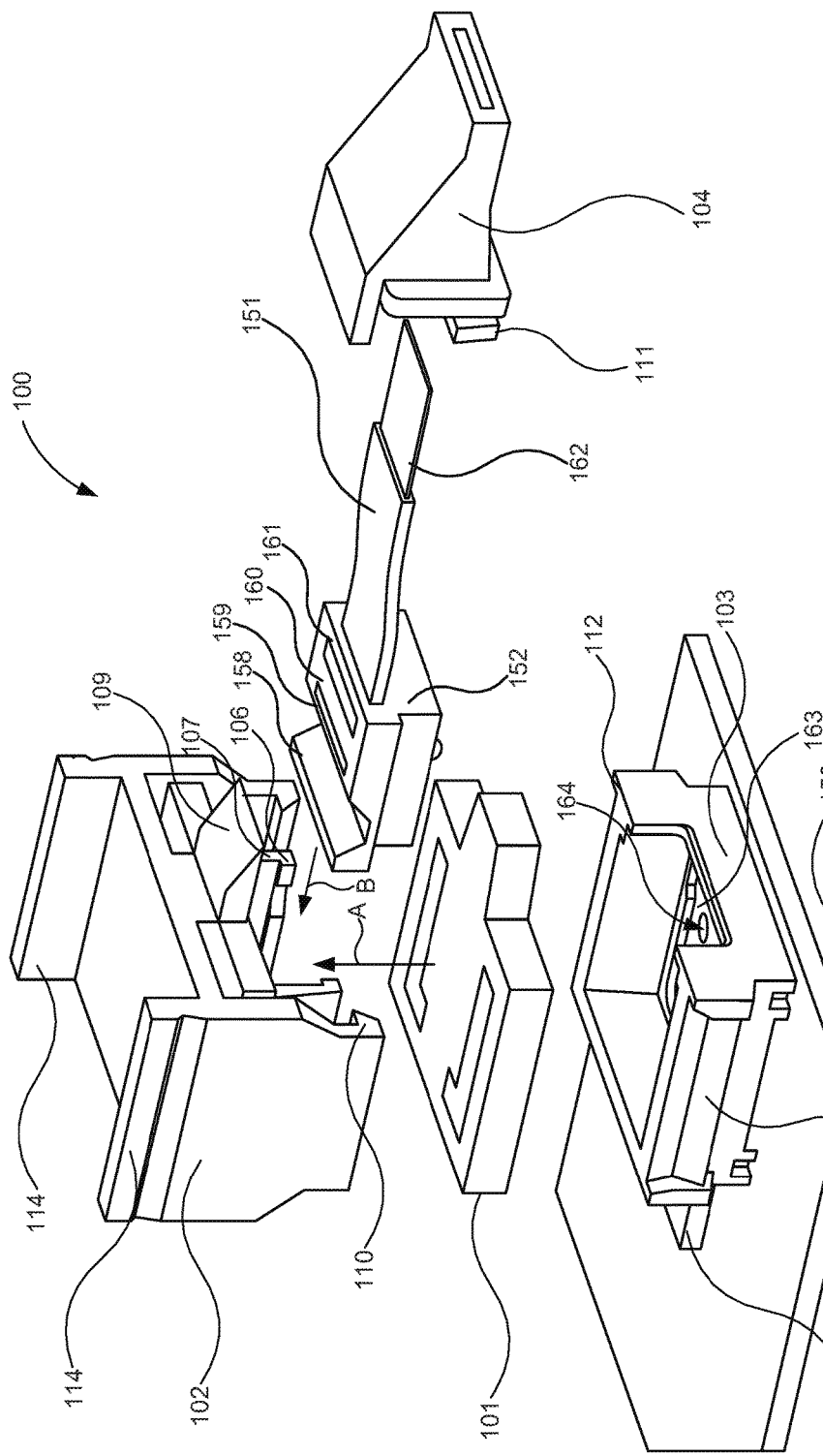
FIG. 1 is an isometric exploded view of an optical interconnect, according to one example of the principles described herein.

As mentioned above, the use of optical interconnects (OI) for high-speed data communication is increasing. In some computing networks, OI may be placed at the outside of system enclosures of computing devices such as servers in order to simplify connection of optical cables. In some examples, however, the OI are moved inside the system enclosures, next to processors and application specific integrated circuits (ASICs) in order to simplify designs, save power and space, and improve signal integrity, noise immunity, and susceptibility to electromagnetic interference (EMI) and electromagnetic compatibility issues.

Optical interconnect systems that are moved inside the system enclosures, next to processors and ASICs may be referred to as mid-board optics (MBO). In MBO systems, the OI includes at least two main assemblies; the electrical subassembly (ESA) and the optical fiber connector cable assembly (CA). The CA may be permanently attached to the ESA (i.e., pig-tailed), or may be selectively coupled and decoupled into an optical socket coupled to the ESA. The ability of a cable assembly to mate and decouple an OI with respect to an ESA may be referred to as a "connectorized" CA.

OI may use one or more light sources (e.g., lasers) and a number of detectors (e.g., photodiodes) to send and receive the data signals. The various optical elements within an OI such as, for example, optical fibers, 'active' elements such as lasers and photodiodes, and lenses should be precisely aligned within, for example, a few microns in order to achieve efficient optical transmission with acceptable energy loss. If a force is applied to, for example, an optical cable coupled to the OI, this force may cause misalignment of a component, such as the optical connector, thereby creating a disturbance in the transmission of data or may even damage elements of the OI. Further, OIs are sensitive to contaminants such as dust. In some instances, contaminants enter space within an optical transceiver. In these situations, the performance of the optical interconnect and its ability to properly transmit data may be compromised as the contaminants may interrupt the transmission of light between elements, such as lenses, operating in the optical paths within the OI.

Examples described herein provide a system for interfacing a ferrule with a socket. The system includes a socket coupled to an electrical subassembly (ESA), an optical connector that includes a cover and other parts to mechanically couple a ferrule to the socket, and a gasket interposed between the cover and the ferrule. The gasket applies a compression force against the top surfaces of the ferrule to secure the ferrule to the base of the socket. The cover may include a number protrusions in the form of ribs or bosses to locally produce higher compression of the gasket and increase the compression force between the ferrule and the socket at specific locations, the compression force being transmitted from the cover, through the gasket, and to the ferrule. The ESA is part of a mid-board optic (MBO) assembly.

The system may further include a boot to create a seal in the area where the optical fibers exit the connector and where the connector couples to the socket. To this end, the boot includes specific geometry to seal the interface between the connector and socket in the area where the fibers exit the socket.

The system may further include a number of alignment features formed in the ferrule, and a number of alignment recesses defined in the socket that mate with the alignment features. The alignment features and the alignment recesses align a number of optical features of the ferrule with respect to optical elements that transmit and receive light, disposed within the socket.

The system may further include a number of latches formed on the cover to interface with a number of catches formed on the socket, and a number of ferrule retainers formed on the cover to couple the ferrule to the cover. A distance between an interface of the latches and the catches is dimensioned such that, when the cover is coupled to the socket via the latches and the catches, the ferrule disengages from the ferrule retainers due to the ferrule interfacing with a ferrule seat defined in the socket. In this manner, the ferrule is allowed to move vertically toward the gasket, thereby adjusting its position to accommodate normal mechanical tolerances in the parts of the assembly.

Examples described herein further provide an optical connector assembly for interfacing a ferrule with a socket. The system includes a cover. The cover includes a number of ferrule retainers formed on the cover to couple a ferrule to the cover. The ferrule may also be coupled to the cover by means of a separate part that holds the ferrule and allows it to move in a direction normal to the ESA as the connector is attached to and detached from the socket. This vertical motion allows or the optical connector assembly to take up mechanical tolerances within the system and allows the ferrule to seat against the base of the socket. The system further includes a gasket disposed between the cover and the ferrule to apply a compression force against the ferrule to secure the ferrule to the ferrule retainers. The gasket may be made of a material that can withstand significant elastic deformation and recover the bulk of its original shape following long exposure to compressive strain. In one example, the elastic material may be compressed to a 10-50% thickness reduction. The material of the gasket may also be able to withstand elevated temperatures of up to, for example, 100° C. or higher). The elastic deformation of the material to create a spring force biased to force the ferrule away from the cover. In one example, the material is an elastomer resistant to compression set. The optical connector assembly may further include an adhesive disposed on at least one surface of the gasket to adhere the gasket to the cover.

The optical connector assembly further includes a boot to create a seal between the optical connector, a number of optical fibers coupled to the ferrule, and the socket. In one example, the boot is monolithically formed with the gasket.

Examples described herein further provide a ferrule connector assembly for interfacing a ferrule with a socket. The ferrule connector assembly includes a cover for coupling a ferrule to a socket, and an elastomeric gasket shaped to interface with the cover. The gasket compresses the ferrule against the socket when the cover is coupled to the socket by creating a spring force between the cover and the ferrule. Further, the gasket seals an interface between the ferrule and the socket. The ferrule connector assembly further includes a number of protrusions formed in the cover to increase the compression force between the cover and the ferrule in order to deliver a specific compressive force against the top of the ferrule and maintain the proper position of the ferrule in the socket in order to address the presence of vibration or mechanical loads applied to the optical fibers coupled to the ferrule.

As used in the present specification and in the appended claims, the terms "elasticity," "elastic deformation," or similar language is meant to be understood broadly as the ability of a body to resist a permanent or semi-permanent deformation, and the ability of the body to return to its original size and shape when a force applied thereto is removed. Thus, materials with elastic properties also referred to as 'compression set resistance' will return to their initial shapes and sizes when these forces are removed.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 2:
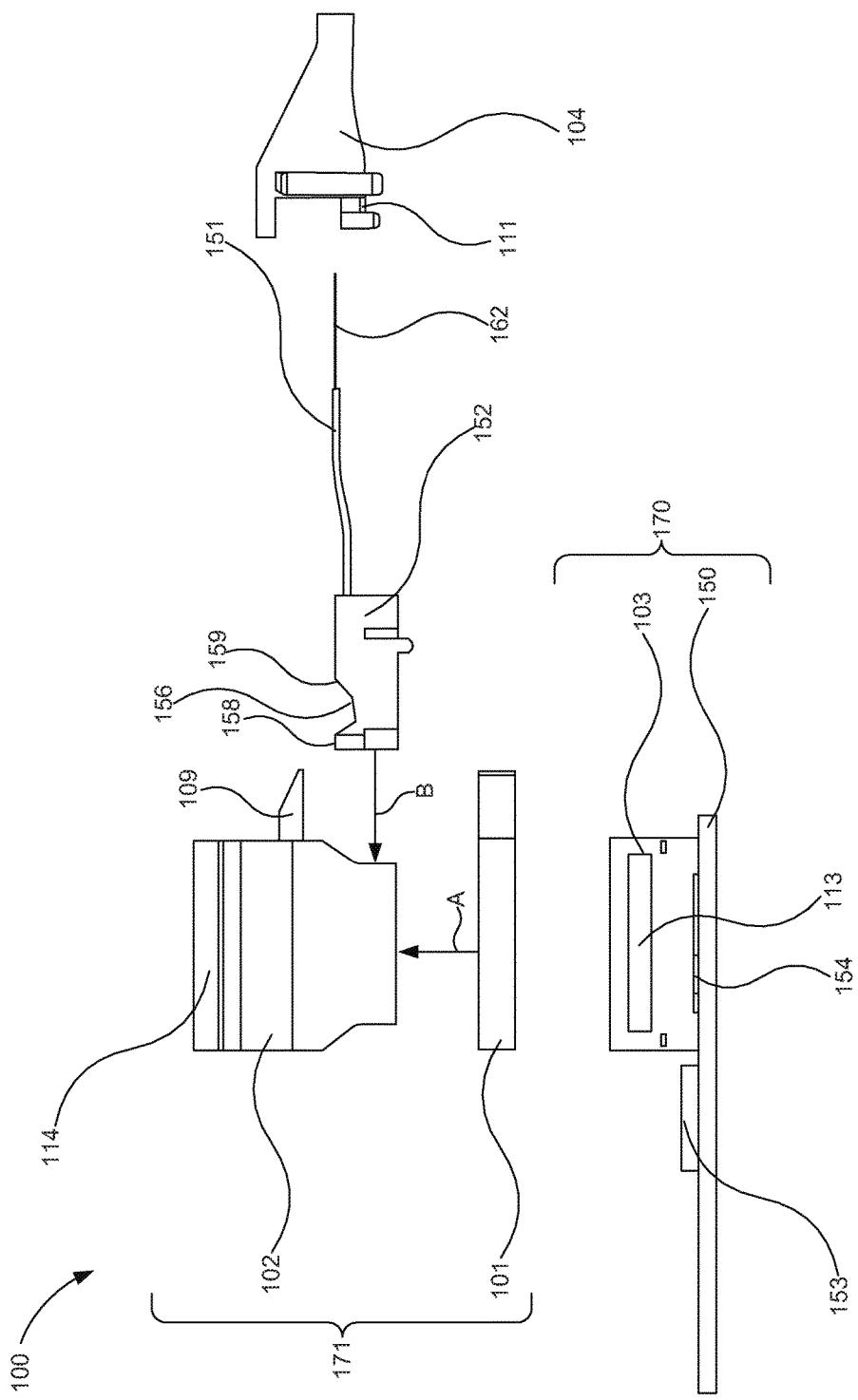
FIG. 2 is an exploded side view of the optical interconnect of FIG. 1, according to one example of the principles described herein.

Turning now to the figures, FIG. 1 is an isometric, exploded view of an optical interconnect assembly (OIA) (100), according to one example of the principles described herein. FIG. 2 is an exploded, side view of the optical interconnect assembly (100) of FIG. 1, according to one example of the principles described herein. The OIA (100) may be used within any type of computing device that utilizes optical fibers to transmit data to and from the computing device. In one example, the OIA (100) is located inside the computing device juxtaposition to processing elements such as a processor or an application specific integrated circuit (ASIC) and may be classified as a mid-board optics (MBO) system. A MBO system allows for the computing device to simplify the design of the optical interconnect (OI), save electrical power and space within the computing device and the surrounding environment, and improve signal integrity, increase noise immunity, and improve susceptibility to electromagnetic interference (EMI) and electromagnetic compatibility issues.

The OIA (100) includes two main portions; the electrical subassembly (ESA) (170) and the connector assembly (171). The ESA (170) includes a socket (103) disposed on a printed circuit board (PCB) (150), a processing device (153) electrically coupled to the PCB (150), and an array of lasers and photodiodes (154). The processing device (153) may be any device that processes data received at the OIA (100) and may include, for example, a processor, an ASIC, circuitry for driving optical transmitters and receiving signals from photodiodes, other types of processing devices, or combinations thereof.

The optical transceiver (154) may include, for example, a number of optical receivers or detectors such as photodetectors or other optical semiconductors. The optical transceiver (154) may also include a number of optical sources for sending signals in the form of light through the optics of the OIA (100), and may include, for example, vertical-cavity surface-emitting laser (VCSEL), lasers, photodiodes, and other light emitting devices. Although shown as a combined source/detector, the optical transceiver (154) may be provided as single-function optical sources or single-function optical detectors, and, in some example, may not provide dual-functionality in all examples.

The socket (103) receives elements of the CA (171) including, for example, a gasket (101), a cover (102), a ferrule (152), an optical cable (151) also referred to as a fiber ribbon, and a boot (104). The cover (102) comprises a number of latches (110) that interface with a number of catches (113) located on the socket (103) to couple the cover (102) to the socket (103). The cover (102) may also include a number of cover protrusions (106) including a number of ferrule retainers (107) appended thereto. In another example, a separate part may be used to couple the ferrule to the cover.

In the example of FIGS. 1 through 9, two ferrule retainers (107) are dimensioned with respect to one another and the remaining portions of the cover (102) to retain the ferrule (152) between the two ferrule retainers (107) and within the cover (102). The description with regard to the gasket (101), cover (102), ferrule (152), optical cable (151), and boot (104) will now be described in more detail in connection with FIGS. 3 through 7.

Figure 3:
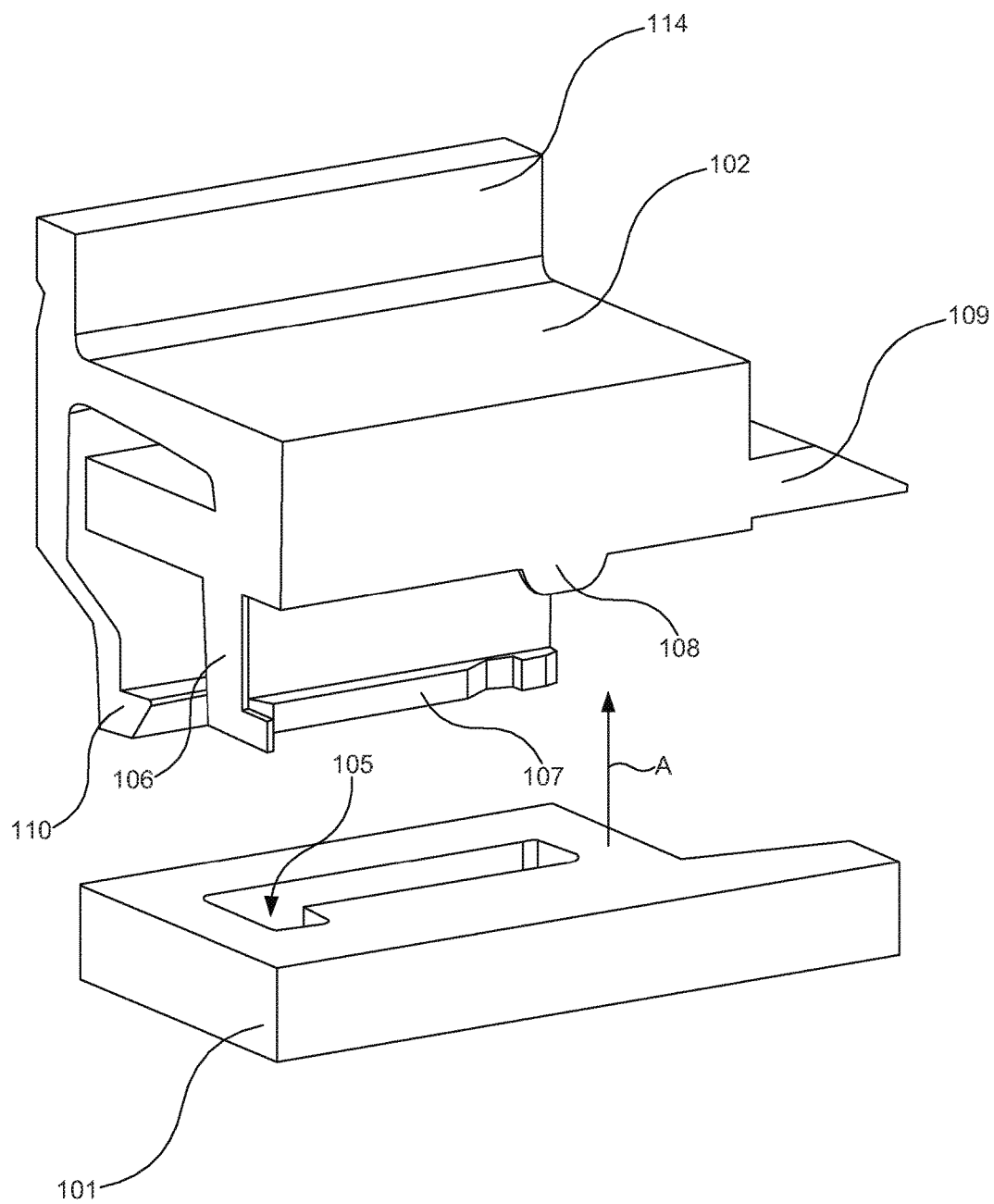
FIG. 3 is an isometric, exploded, cutaway view of a cover and gasket of the optical interconnect of FIG. 1, according to one example of the principles described herein.
Figure 4:
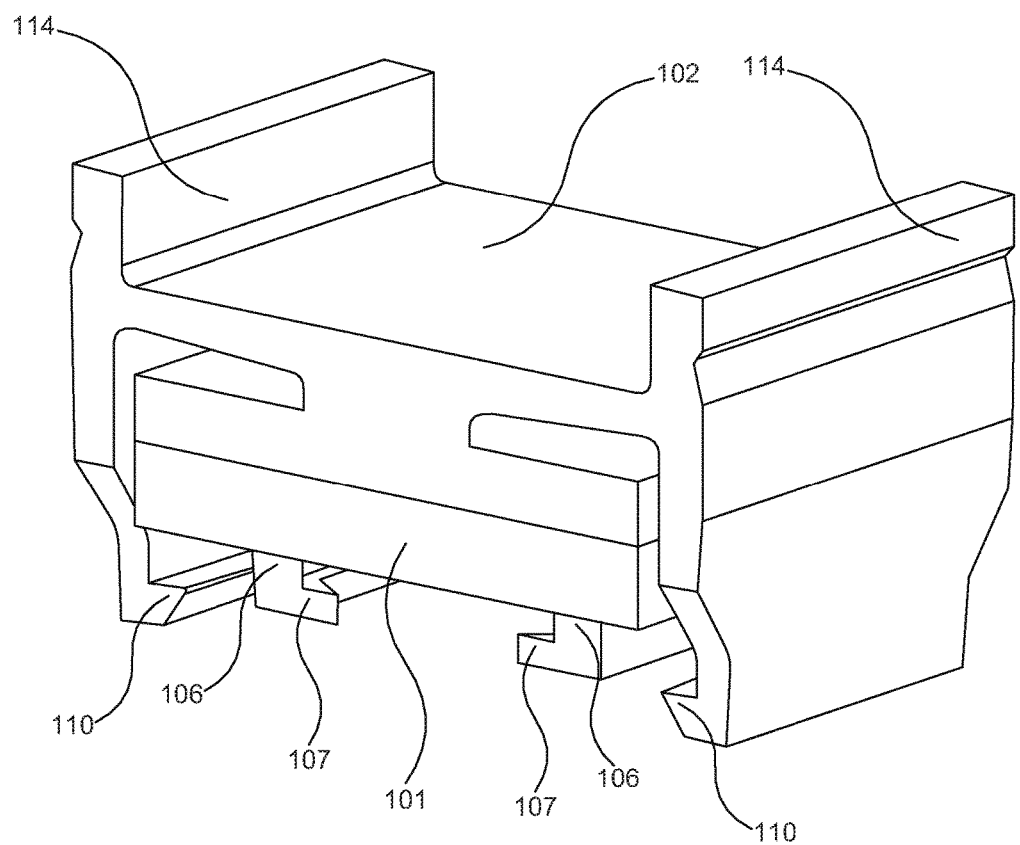
FIG. 4 is an isometric view of the cover and gasket of the optical interconnect of FIG. 1 in a coupled orientation, according to one example of the principles described herein.
Figure 5:
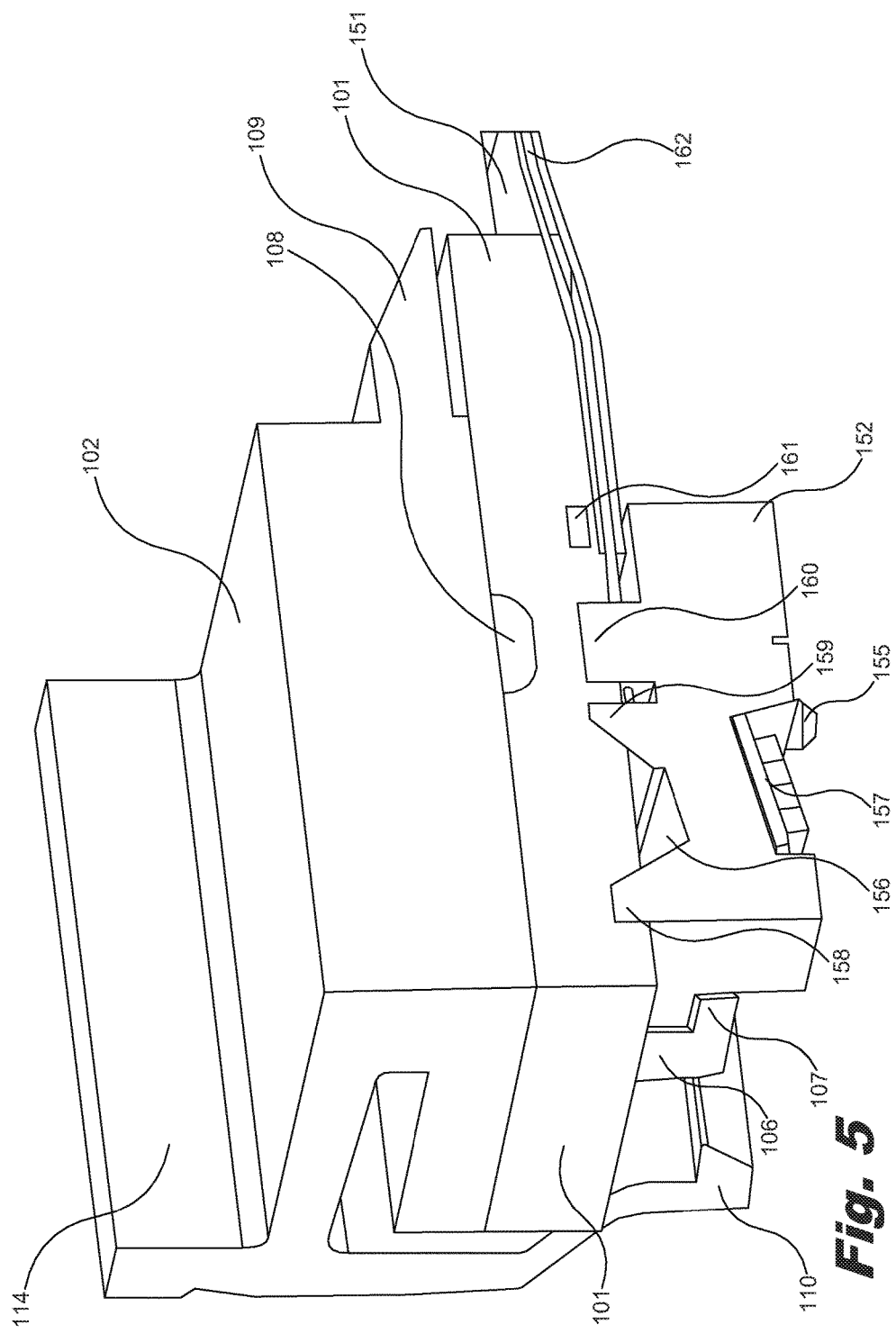
FIG. 5 is an isometric, cutaway view of a cover, gasket, and ferrule of the optical interconnect of FIG. 1, according to one example of the principles described herein.
Figure 6:
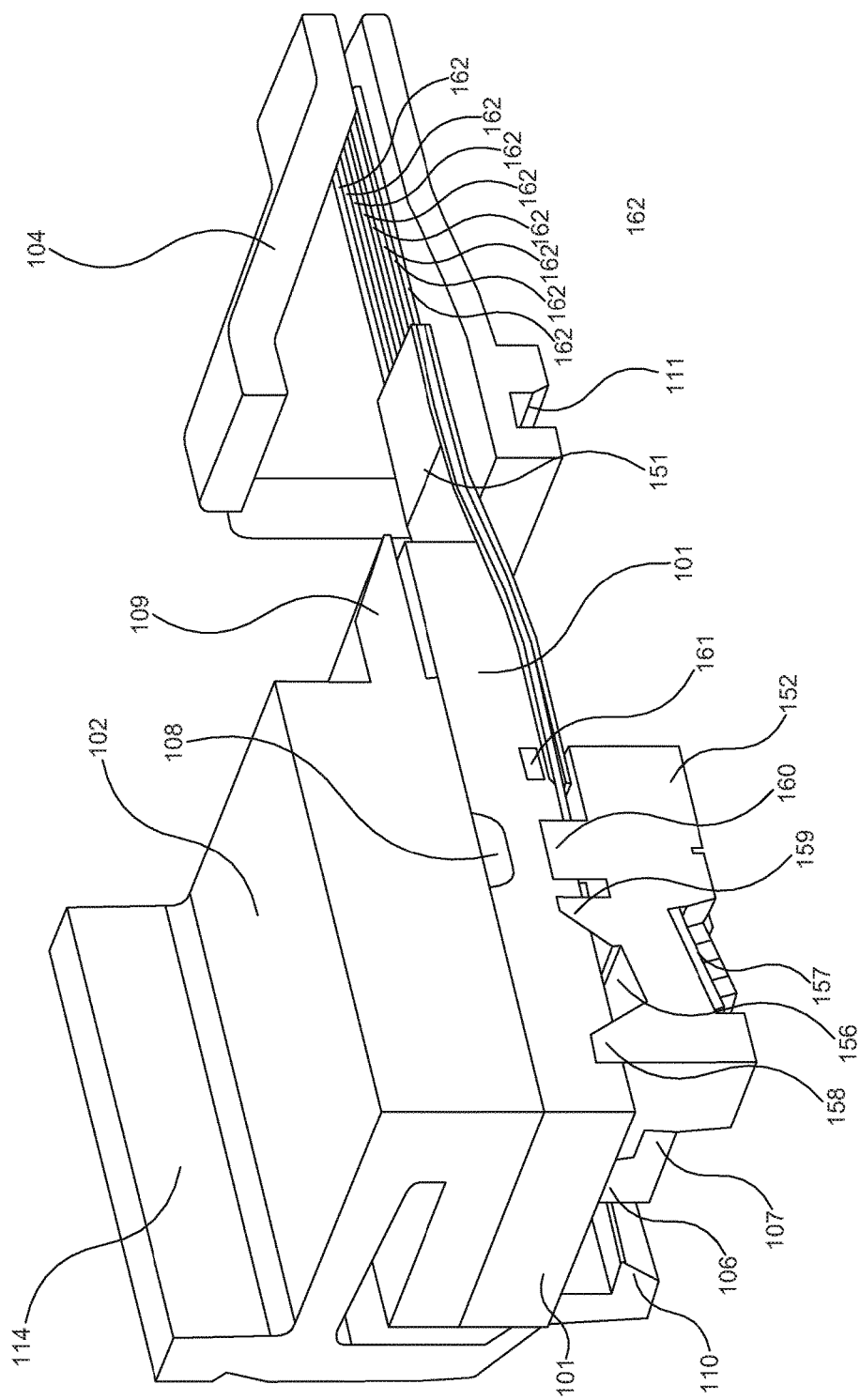
FIG. 6 an isometric, partially exploded, cutaway view of a cover, gasket, ferrule, and boot of the optical interconnect of FIG. 1, according to one example of the principles described herein.
Figure 7:
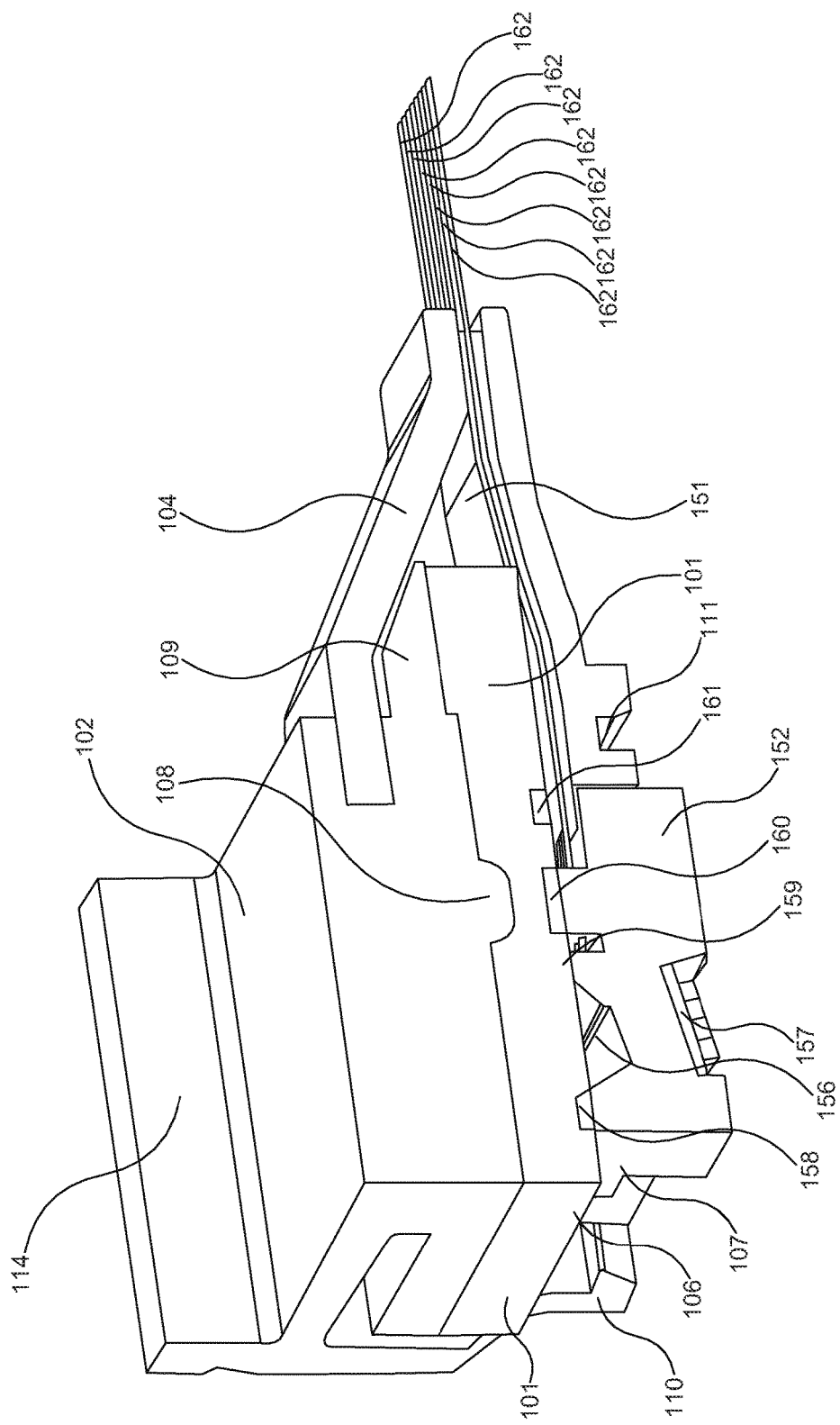
FIG. 7 an isometric, cutaway view of a cover, gasket, ferrule, and boot of the optical interconnect of FIG. 1 forming a connector assembly, according to one example of the principles described herein.

FIG. 3 is an isometric, exploded, cutaway view of the cover (102) and gasket (101) of the optical interconnect assembly (100) of FIG. 1, according to one example of the principles described herein. Further, FIG. 4 is an isometric view of the cover (102) and gasket (101) of the optical interconnect assembly (100) of FIG. 1 in a coupled orientation, according to one example of the principles described herein. Still further, FIG. 5 is an isometric, cutaway view of the cover (102), gasket (101), and ferrule (152) of the optical interconnect assembly (100) of FIG. 1, according to one example of the principles described herein. Yet further, FIG. 6 an isometric, partially exploded, cutaway view of the cover (102), gasket (101), ferrule (152), and boot (104) of the optical interconnect assembly (100) of FIG. 1, according to one example of the principles described herein. In addition, FIG. 7 an isometric, cutaway view of a cover (102), gasket (101), ferrule (152), and boot (104) of the optical interconnect assembly (100) of FIG. 1 forming a connector assembly, according to one example of the principles described herein.

As depicted in, for example, FIGS. 1 through 3, arrow A indicates a direction of interface between the gasket (101) and the cover (102). The gasket (101) includes a number of gasket apertures (105) defined therein. The gasket (101) interfaces with the cover (102) by moving the gasket (101) in the direction of arrow A and allowing the cover protrusions (106) and ferrule retainers (107) to enter through the gasket apertures (105). The gasket (101) then reaches and abuts against a main body portion of the cover (102) as depicted in FIG. 4. The gasket (101) and cover protrusions (106) and ferrule retainers (107) of the cover (102) are dimensioned to allow a bottom surface of the gasket (101) to be located above the ferrule retainers (107) to allow the ferrule (152) to engage with the ferrule retainers (107).

As will continue to be described herein, the gasket (101) functions to create a spring force between the cover (102) and the ferrule (152), and also functions to seal the interface between the ferrule (152) and the socket (103) and between the cover (102) and the socket (103) as will be described in more detail below. In order to fulfil these two purposes, the gasket (101) is made of a material that can withstand significant elastic deformation. In one example, the elastic material of the gasket (101) has high compression set resistance and will recover a significant amount or all of its original shape when exposed to compressive deformation. Thus, the gasket (101) is able to resist a permanent or semi-permanent deformation. Further, the gasket (101) is able to return to its original size and shape when a force applied thereto is removed. In one example, the material from which the gasket (101) is made is resistant to compression setting. Compression setting may be defined as a permanent deformation under compressive load and/or heat. In one example, the gasket (101) is made of an elastomer, a polymer, a rubber, a silicone, other elastic material, or combinations thereof. In one example, the gasket may be made using any number of manufacturing processes including injection molding processes, stamping processes, cutting processes, ablation processes, etching processes, other manufacturing processes, or combinations thereof.

Further, the gasket (101) includes a material that has a predefined level of durometer or stiffness. Durometer is one of several measures of the hardness of a material and may be defined as a material's resistance to permanent indentation. By selecting the proper material durometer for the gasket (101), and optimizing the thickness of the gasket (101) and adjacent elements within the OIA (100), the sealing and spring functions of the gasket (101) may be optimized. For example, a relatively low durometer (i.e., soft) material may best function as to sealing the interface between the ferrule (152) and the socket (103) and between the cover (102) and the socket (103). However, a relatively low durometer material may not apply a large enough force to hold the ferrule (152) in place within the socket (103) in the presence of vibration or force on the optical cable (151). Additional spring force may be developed by thickening the gasket (101) locally, or by adding thickness to adjacent parts such as in the cover (102). The thickening of the cover (102) to increase the spring force of the gasket (101) is depicted in FIGS. 3 and 5-9, where a cover rib (108) is formed on the cover (102) above a position where the ferrule (152) is seated. This rib (108) causes additional compression and deformation to the gasket (101) which, in turn, increases force at the top surface of the ferrule (152). This increase in force may be defined by the following equation:

$$F=k*x \quad\quad\quad \text{Eq. 1}$$

where F is the spring force, k is the spring constant of the gasket (101) which is associated with material durometer, and x is the deformation of the material. The material of the gasket (101) will be further described below in connection with the interfacing of the ferrule (152) and the cover (102), and the interfacing of the cover (102) with the socket (103).

In one example, an adhesive may be applied to any portion or side of the gasket (101) to adhere the gasket to surrounding elements including, for example, the cover (102), the ferrule (152), the boot (104), and the socket (103). For example, an adhesive may be applied to the top of the gasket (101), as depicted throughout the figures, in order to adhere the gasket (101) to the underside of the cover (102). In another example, an adhesive may be applied to the interior walls of the gasket apertures (105) to adhere the internal walls of the gasket apertures (105) to the cover protrusions (106). In still another example, an adhesive may be applied to the bottom of the gasket (101) as depicted throughout the figures in order to adhere the gasket (101) to the top side of the socket (103). Thus, an adhesive may be disposed on at least one surface of the gasket (101) to adhere the gasket (101) to the cover (102) or other elements of the OIA (100).

With reference to FIGS. 1, 2, and 5, the ferrule (152) is engaged with the ferrule retainers (107) of the cover (102) as indicated by arrow B in FIGS. 1 and 2, and couples to the cover (102) as depicted in FIG. 5. In one example, an interference fit is created between the gasket (101) and the ferrule (152) such that the ferrule (152) is engaged with the ferrule retainers (107) in a secure manner due to compressive and frictional forces provided by the gasket (101) and its interface with ferrule (152).

Figure 8:
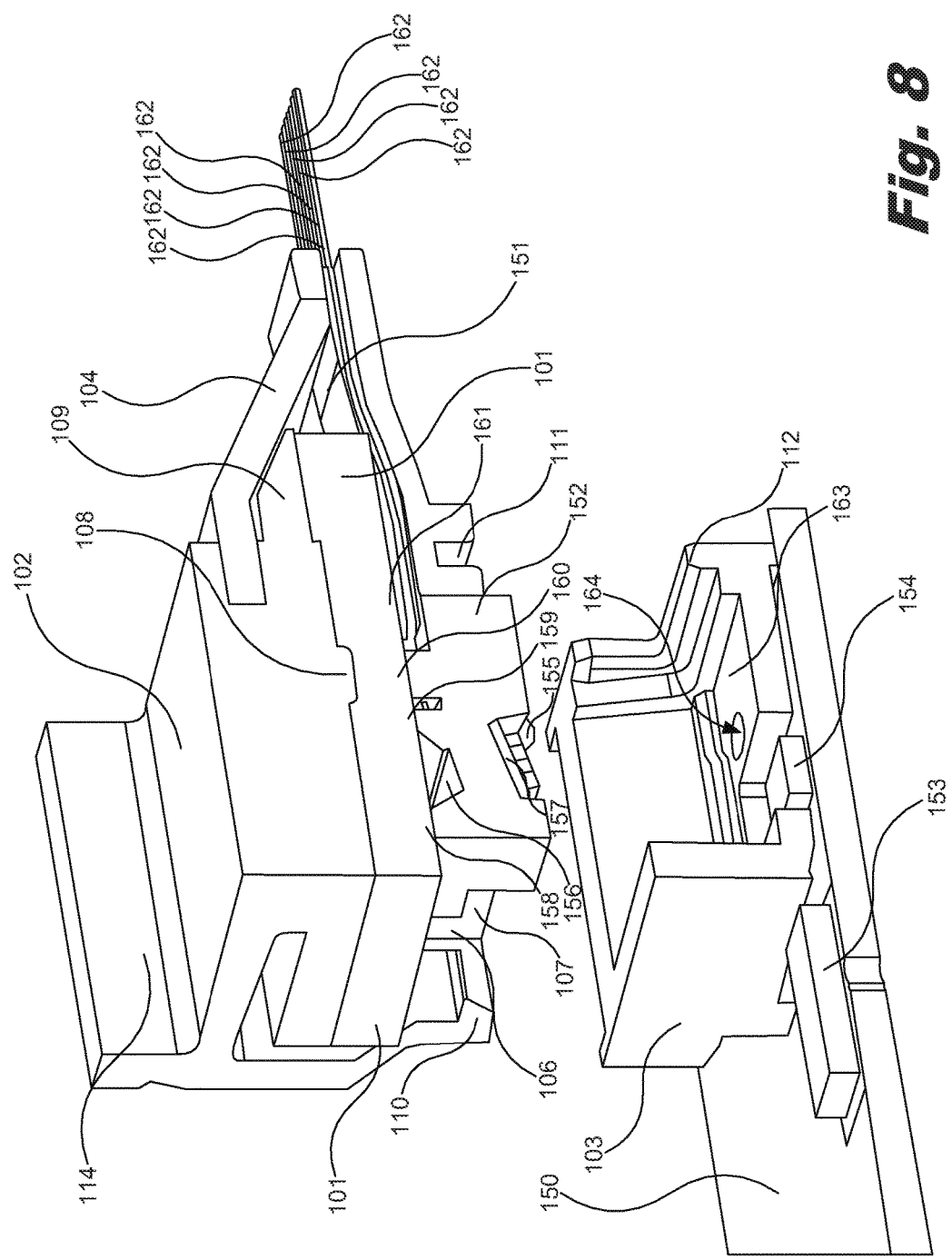
FIG. 8 is an isometric, cutaway view of the connector assembly of FIG. 7 before coupling to an electrical subassembly, according to one example of the principles described herein.
Figure 9:
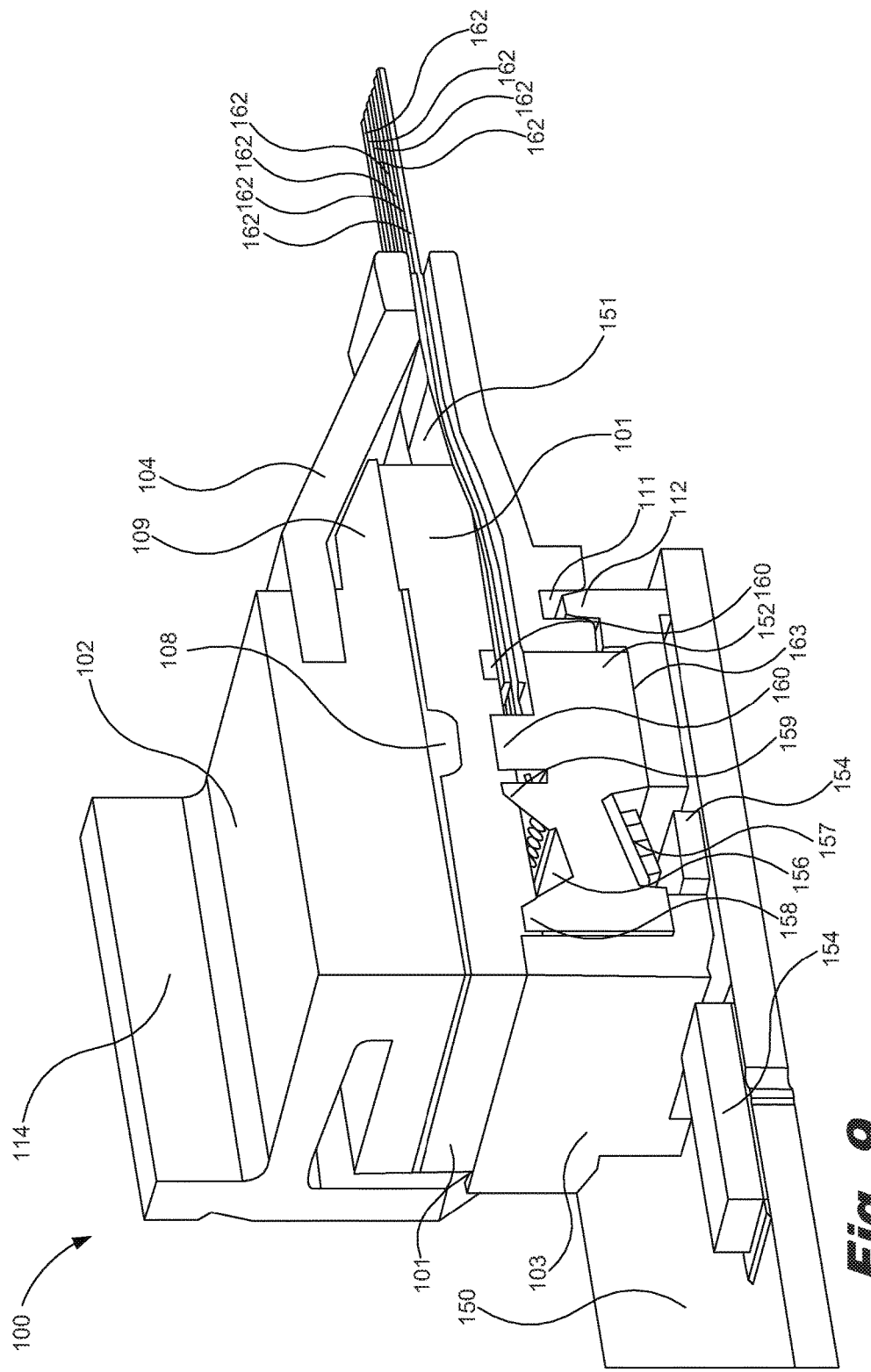
FIG. 9 is an isometric, cutaway view of the connector assembly of FIG. 7 coupled to an electrical subassembly, according to one example of the principles described herein.

A description of the ferrule (152) will now be provided in connection with the figures already introduced as well as in connection with FIGS. 8 and 9. FIG. 8 is an isometric, cutaway view of the connector assembly (171) of FIG. 7 before coupling to an electrical subassembly (170), according to one example of the principles described herein. FIG. 9 is an isometric, cutaway view of the connector assembly (171) of FIG. 7 coupled to an electrical subassembly (170), according to one example of the principles described herein. The ferrule (152) includes a lens array (156) as depicted in FIGS. 2 and 5 through 9. The lens array (156) receives optical signals from an optical cable (151) optically coupled to the ferrule (152). When the ferrule (152) is optically coupled to the socket, the ferrule (152) further relays those optical signals to ferrule optics (157) and the optical transceiver (154), or directly to the optical transceiver (154). The ferrule (152) operates to couple light bi-directionally between a number of optical fibers (162) embedded in the ferrule (152) and receiving devices, such as photodiodes (154) on the ESA (170), and between one or more emitting devices (154) on the ESA (170) and optical fibers (162) embedded in the ferrule (152). In this manner, optical signals sent through the optical cable (151) are relayed to the optical transceiver (154), and may be processed by the processing device (153).

The optical cable (151) may be connected to the ferrule (152) during, for example, a molding process of the ferrule (152) or during a secondary process of attachment. The optical cable (151) includes a number of optical fibers (162) as depicted in, for example, FIGS. 1, 2, and 5 through 9. The optical fibers each carry a light signal to and from the ferrule (152).

Referring again to FIGS. 5 through 9, the ferrule (152) includes a number of surfaces including a first (158), second (159), a third (160), and a fourth (161) ferrule protrusion surfaces. These surfaces may all lie on the same plane and are formed by removal of material from the ferrule (152) to accommodate for, for example, the lens array (156) and to expose portions of the optical cable (151) and its optical fibers (162) as depicted as being defined between the second ferrule surface (159) and the third ferrule surface (160), and between the third ferrule surface (160) and the fourth ferrule surface (161). These ferrule surfaces (158, 159, 160, 161) create a topography of the ferrule (152) that may be used in connection with the shape of the cover (102) to increase the spring force exerted by the gasket (101). For example, the cover (102) may include a number of protrusions in the form of ribs or bosses (108) formed on the cover (102) that act to create additional compression and deformation to the gasket (101), and thereby develop additional force at the top surface of the ferrule (152) according to Equation 1, above.

Turning again to FIGS. 1, 2, and 6 through 9, a boot (104) is coupled to the cover (102), the gasket (101), and the ferrule (152). The boot (104) serves to seal the entry of the optical cable (151) to the ferrule (152) by encompassing the interface between the ferrule (152) and the optical cable (151) and abutting the surfaces of the cover (102) including the boot protrusion (109), the gasket (101), and the socket. The boot protrusion (109) serves to support the boot (104) and to secure the boot (109) to the cover (102) through, for example, friction between the boot protrusion (109) and the boot (104). In one example, an adhesive may be used to couple the boot (104) to the cover (102), the gasket (101), the socket (103), or combinations thereof.

Further, the boot (104) is coupled to the socket (103) through the use of a socket interface (111) defined in the boot (104) and a boot interface (112) formed in the socket (103). As depicted in FIGS. 8 and 9, a connector assembly (CA) (171) including the cover (102), the gasket (101), the ferrule (152), and the boot (104) may be coupled to the socket (103). The socket interface (111) defined in the boot (104) interfaces with the boot interface (112) formed in the socket (103) as the cover (102) is coupled to the socket (103). In this manner, the boot (104) is secured not only to the cover (102), the gasket (101), the ferrule (152), but is also secured to the socket (103). This increases the surety of the seal between the elements within the OIA (100) by not permitting contaminants to enter the OIA (100) via the boot (104).

In one example, the gasket (101) and the boot (104) are monolithically formed from the same piece of elastic material. In this example, the monolithic gasket/boot element is molded or otherwise manufactured as a single piece. This may reduce manufacture costs and provide additional support to the boot (109) portion of the monolithic gasket/boot element.

The boot (104), in addition to sealing the ferrule (152) and other elements of the OIA (100) from contamination, may also serve to provide strain relief if a force was applied to the optical cable (151). For example, in many cases, a user may intentionally or unintentionally pull on the optical cable (151) while the optical cable (151) is coupled to ferrule (152), the cover (102), the socket (103), or combinations thereof. The boot (104) allows for a certain length of the optical cable (151) to be pulled away from the OIA (100) without compromising the integrity of the signals transferred through the optical cable (151) through the ferrule (152), and to the array of lasers and photodiodes (154) located within the socket (103). In this manner, the boot (104) serves to reduce or eliminate any lapses in communication and damage to the optical cable (151).

Having described various elements within the OIA (100), the interaction between the gasket (100), cover (102), the socket (103), and the ferrule (152) before and during coupling of the connector assembly (CA) (171) to the electrical subassembly (ESA) (170) will now be described in connection with FIGS. 8 and 9. In FIG. 8, the CA (171) is positioned above and decoupled from the ESA (170). In this state, the gasket (101) pushes with a spring force against the ferrule (152). In this state, the ferrule (152) is engaged with the ferrule retainers (107) of the cover (102). A depiction of this state may be seen in, for example, FIG. 5 where a lip portion of the ferrule (152) is depicted as being engaged with or abutting the ferrule retainers (107). Further, in the state as depicted in FIG. 8, the ferrule (152) is engaged with the ferrule retainers (107) in a secure manner due to compressive and frictional forces provided by the gasket (101) and its interface with ferrule (152).

In aligning the cover (102) with the socket (103), and, in turn, the ferrule (152) as coupled to the cover (102) with the active optical elements such as the array of lasers and photodiodes (154) located within the socket (103), a number of alignment features (155, 164) may be included in the ferrule (152) and the socket (103). In the example of FIG. 8, a number of posts (155) may be formed on the ferrule (152), and a number of recesses (164) may be defined within the socket (103). When the cover (102) is coupled to the socket (103), the posts (155) and recesses (164) cause the ferrule (152) to optically align with the active optical elements such as the array of lasers and photodiodes (154) located within the socket (103). In FIG. 8, the cross sectional view depicts a single post (155) and recess (164) pair. However, a number of additional pairs may be included in the OIA (100) including on the other side of the OIA (100) not depicted in FIG. 8. The alignment features (155, 164) are interchangeably formable wherein the posts (155) may be formed on the ferrule (152), the recesses (164) may be defined within the socket (103), visa versa, or combinations thereof. In examples where more than one post (155) and recess (164) pair are included in the present systems, a number of posts (155) may be formed in both the ferrule (152) and the socket (103) with corresponding recesses (164) defined in the opposite element relative to the posts (155).

FIG. 9, in contrast to FIG. 8, depicts the cover (102) coupled to the socket (103). As described above in connection with FIG. 1-6, a number of latches (110) of the cover interface with a number of catches (113) located on the socket (103) to couple the cover (102) to the socket (103). When the cover (102) is coupled to the socket (103), the ferrule (152) abuts the ferrule seat (FIG. 8, 163) and aligns with the active optical elements such as the array of lasers and photodiodes (154) using the post (155) and recess (164) pairs. As the cover (102) is coupled to the socket (103), the socket interface (111) of the boot (104) engages with the boot interface (112) of the socket (103).

Further, as the cover (102) is coupled to the socket (103), the ferrule seat (163) pushes the ferrule (152) into the gasket (101). The gasket (101) applies a spring force against the ferrule (152) and forces the ferrule (152) to abut the ferrule seat (163). In this manner, the gasket creates a greater force between the ferrule (152) and the ferrule seat (163).

In one example, a number of protrusions in the form of ribs or bosses (108) are formed into the cover (102) to apply additional compressive or spring force on the ferrule (152). In this example, when the gasket (101) is compressed further, the gasket is able to exert more force. In the example of FIG. 8, the rib (108) is located directly above the second ferrule protrusion (159) in order to ensure that the rib (108) is not simply deforming a portion of the gasket (101) into a recess between the ferrule protrusions (158, 159, 160, 161). Any number of ribs (108) may be formed within the cover (102) above any of the ferrule protrusions (158, 159, 160, 161) to create additional force on the ferrule (152). The ribs (108) may be arranged on the cover (102) such that the additional force from the ribs (108) is evenly distributed along the entire top surface of the ferrule (152).

In one example, the distance between an interface of the latches (110) of the cover (102) and the catches (113) of the socket (103) is dimensioned such that, when the cover (102) is coupled to the socket (103) via the latches (110) and the catches (113), the ferrule (152) disengages from the ferrule retainers (107) due to the ferrule (152) interfacing with a ferrule seat (163) defined in the socket (103). In this example, the ferrule (152) travels upwards towards the cover (102) due to the ferrule seat (163) having abutted the bottom of the ferrule (152) before the latches (110) engage with the catches (113). In this manner, the gasket (101) is even further compressed, allowing the gasket (101) to apply even more force to the top side of the ferrule (152) and create an even tighter interface between the ferrule seat (163) and the bottom of the ferrule (152). This, in turn, further eliminates the possibility of contaminants entering the ferrule (152) and the surrounding elements.

Further, as depicted in FIG. 9, once the cover (102) is coupled to the socket (103), the gasket (101) forms a seal between the cover (102) and the socket (103). This further eliminates the possibility of contaminants entering the internal areas of the OIA (100).

The CA (171) is removable from the ESA (170) by pinching the releases (114) of the cover (102). The releases (114) cause the latches (110) to disengage from the catches (113) of the socket (103). In this manner, the CA (171) may be coupled and decoupled from the ESA (170) any number of times.

The specification and figures describe a system for interfacing a ferrule with a socket includes a socket, a cover to optically couple a ferrule to the socket, and a gasket interposed between the cover and the ferrule. The gasket applies a compression force against the ferrule to secure the ferrule to the socket.

This system may allow for (1) applying, via the gasket, a compression force against the ferrule to secure the ferrule to the socket; and (2) sealing, via the gasket, the ferrule and eliminating the probability of contaminants coming in contact with the ferrule.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for interfacing a ferrule with a socket comprising:
   a socket aligned and attached to an electrical subassembly (ESA);
   a cover to affix a ferrule to the socket, the cover comprising a plurality of cover protrusions; and
   a gasket interposed between the cover and the ferrule, the gasket comprising a plurality of gasket apertures,
   wherein each of the plurality of cover protrusions extends through a respective one of the plurality of gasket apertures, and the gasket applies a compression force against the ferrule to secure the ferrule to the socket and seals an interface between the cover and the socket.

2. The system of claim 1, wherein the cover includes a number of pressure protrusions formed on the cover to locally increase the compression force between the ferrule and the socket, the compression force being transmitted from the cover, through the gasket, and to the ferrule.

3. The system of claim 1, wherein the ESA is part of a mid-board optic (MBO) assembly.

4. The system of claim 1, further comprising a boot to create a seal between the cover, the socket, and a number of optical fibers coupled to the ferrule.

5. The system of claim 4, wherein the boot comprises a socket interface to couple the boot to the socket.

6. The system of claim 1, further comprising:
   a number of first alignment features; and
   a number of second alignment features formed in the socket that mate with the first alignment features,
   wherein the first alignment features and the second alignment features align a number of optical elements of the ferrule with respect to an optical semiconductor disposed within the socket.

7. The system of claim 1, further comprising a number of latches formed on the cover to interface with a number of catches formed on the socket, the plurality of cover protrusions disposed between the number of latches and the ferrule when the ferrule is coupled to the cover.

8. The system of claim 1, further comprising:
   a number of latches formed on the cover to interface with a number of catches formed on the socket; and
   a number of ferrule retainers formed on the plurality of cover protrusions of the cover to couple the ferrule to the cover,
   wherein a bottom surface of the ferrule is disposed below the number of latches and the ferrule retainers and a distance between an interface of the number of latches and the number of catches is dimensioned such that, when the ferrule is coupled to the cover and the cover is coupled to the socket via the number of latches and the number of catches, the ferrule is free to move vertically upward away from the ferrule retainers due to a ferrule seat defined in the socket.

9. The system of claim 8, wherein the plurality of cover protrusions are disposed between the number of latches formed on the cover and the ferrule when the ferrule is coupled to the cover.

10. An optical connector assembly for interfacing a ferrule with a socket comprising:
    a cover, the cover comprising a number of ferrule retainers formed on a plurality of cover protrusions of the cover to couple a ferrule to the cover; and
    a gasket disposed between the cover and the ferrule to apply a compression force against the ferrule to secure the ferrule to the ferrule retainers, the gasket comprising a plurality of gasket apertures;
    wherein each of the plurality of cover protrusions extends through a respective one of the plurality of gasket apertures.

11. The optical connector of claim 10, wherein the gasket is made of a material with resistance to compression setting to maintain, over load and high temperature, a consistent spring force biasing the ferrule away from the cover and onto a base of the socket of the optical connector assembly.

12. The optical connector assembly of claim 11, wherein the material is an elastomer resistant to compression setting.

13. The optical connected assembly of claim 10, further comprising an adhesive disposed on at least one surface of the gasket to adhere the gasket to the cover.

14. The optical connector assembly of claim 10, further comprising a boot to create a seal between the cover, a socket of the optical connector assembly, and a number of optical fibers coupled to the ferrule.

15. The optical connector assembly of claim 14, wherein the boot is monolithically formed with the gasket.

16. The optical connector of claim 10, further comprising a number of latches formed on the cover, the plurality of cover protrusions disposed between the number of latches and the ferrule when the ferrule is coupled to the cover.

17. A ferrule connector assembly for interfacing a ferrule with a socket comprising:
    a cover for coupling a ferrule to a socket, the cover having a plurality of cover protrusions; and
    an elastomeric gasket shaped to interface with the cover, the elastomeric gasket comprising a plurality of gasket apertures;
    wherein the elastomeric gasket compresses the ferrule against the socket when the cover is coupled to the socket by creating a spring force between the cover and the ferrule,
    wherein the elastomeric gasket seals an interface between the ferrule and the socket, and
    wherein each of the plurality of cover protrusions extends through a respective one of the plurality of gasket apertures.

18. The ferrule connector assembly of claim 17, further comprising a number of pressure protrusions formed in the cover to increase the compression force between the cover and the ferrule.

19. The ferrule connector assembly of claim 17, further comprising a number of latches formed on the cover, the plurality of cover protrusions disposed between the number of latches and the ferrule when the ferrule is coupled to the cover.

* * * * *